United States Patent
Sivathanu et al.

(10) Patent No.: US 10,282,304 B2
(45) Date of Patent: May 7, 2019

(54) CACHING USING AN ADMISSION CONTROL CACHE LAYER

(71) Applicant: VMWARE, INC., Palo Alto, CA (US)

(72) Inventors: Sankaran Sivathanu, Bangalore (IN); Sai Inabattini, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 176 days.

(21) Appl. No.: 15/259,074

(22) Filed: Sep. 8, 2016

(65) Prior Publication Data

US 2017/0315923 A1    Nov. 2, 2017

(30) Foreign Application Priority Data

Apr. 27, 2016  (IN) .............................. 201641014619

(51) Int. Cl.
*G06F 12/0897* (2016.01)
*G06F 12/0888* (2016.01)
*G06F 9/455* (2018.01)

(52) U.S. Cl.
CPC ...... *G06F 12/0897* (2013.01); *G06F 12/0888* (2013.01); *G06F 9/45533* (2013.01); *G06F 2212/604* (2013.01)

(58) Field of Classification Search
CPC combination set(s) only.
See application file for complete search history.

(56) References Cited

U.S. PATENT DOCUMENTS

| 2013/0111133 A1* | 5/2013 | Benhase ............. G06F 12/0888 711/122 |
| 2015/0193144 A1* | 7/2015 | Bilas ....................... G06F 3/064 711/103 |

* cited by examiner

*Primary Examiner* — Eric Cardwell
(74) *Attorney, Agent, or Firm* — Fish & Richardson P.C.

(57) ABSTRACT

Exemplary methods, apparatuses, and systems receive from a client a request to access data from a client. Whether metadata for the data is stored in a first caching layer is determined. In response to the metadata for the data not being stored in the first caching layer, it is determined if the data is stored in the second caching layer. In response to determining that the data is stored in the second caching layer, the data is retrieved from the second caching layer. In response to determining that the data is not stored in the second caching layer, writing of the data to the second caching layer is bypassed. The retrieved data is sent to the client.

19 Claims, 5 Drawing Sheets

FIRST CACHING LAYER 300

| Index | Metadata |
|---|---|
| 0 | 4 |
| 1 | |
| 2 | |
| 3 | |
| 4 | |
| ... | ... |
| m | |

SECOND CACHING LAYER 305

| Index | Metadata | Data |
|---|---|---|
| 0 | | |
| 1 | | |
| 2 | | |
| 3 | | |
| 4 | | |
| ... | ... | ... |
| n | | |

MAIN MEMORY 310

| Index | Data |
|---|---|
| 0 | xyz |
| 1 | abc |
| 2 | def |
| 3 | mno |
| 4 | tuv |
| ... | ... |
| p | jhg |

FIG. 3B

FIRST CACHING LAYER 300

| Index | Metadata |
|---|---|
| 0 | 3 |
| 1 | 1 |
| 2 | 4 |
| 3 | |
| 4 | |
| ... | ... |
| m | |

SECOND CACHING LAYER 305

| Index | Metadata | Data |
|---|---|---|
| 0 | | |
| 1 | | |
| 2 | | |
| 3 | | |
| 4 | | |
| ... | ... | ... |
| n | | |

MAIN MEMORY 310

| Index | Data |
|---|---|
| 0 | xyz |
| 1 | abc |
| 2 | def |
| 3 | mno |
| 4 | tuv |
| ... | ... |
| p | jhg |

FIG. 3C

FIRST CACHING LAYER 300

| Index | Metadata |
|---|---|
| 0 | 4 |
| 1 | 3 |
| 2 | 1 |
| 3 | |
| 4 | |
| ... | ... |
| m | |

SECOND CACHING LAYER 305

| Index | Metadata | Data |
|---|---|---|
| 0 | 4 | tuv |
| 1 | | |
| 2 | | |
| 3 | | |
| 4 | | |
| ... | ... | ... |
| n | | |

MAIN MEMORY 310

| Index | Data |
|---|---|
| 0 | xyz |
| 1 | abc |
| 2 | def |
| 3 | mno |
| 4 | tuv |
| ... | ... |
| p | jhg |

FIRST CACHING LAYER
300

| Index | Metadata |
|---|---|
| 0 | 2 |
| 1 | 3 |
| 2 | 1 |
| 3 | p |
| 4 | 4 |

SECOND CACHING LAYER
305

| Index | Metadata | Data |
|---|---|---|
| 0 | 1 | abc |
| 1 | 4 | tuv |
| 2 | 3 | mno |
| 3 | | |
| 4 | | |
| ... | ... | ... |
| n | | |

MAIN MEMORY
310

| Index | Data |
|---|---|
| 0 | xyz |
| 1 | abc |
| 2 | def |
| 3 | mno |
| 4 | tuv |
| ... | ... |
| p | jhg |

FIG. 3D

FIRST CACHING LAYER
300

| Index | Metadata |
|---|---|
| 0 | 0 |
| 1 | 2 |
| 2 | 3 |
| 3 | 1 |
| 4 | p |

SECOND CACHING LAYER
305

| Index | Metadata | Data |
|---|---|---|
| 0 | 1 | abc |
| 1 | 4 | tuv |
| 2 | 3 | mno |
| 3 | | |
| 4 | | |
| ... | ... | ... |
| n | | |

MAIN MEMORY
310

| Index | Data |
|---|---|
| 0 | xyz |
| 1 | abc |
| 2 | def |
| 3 | mno |
| 4 | tuv |
| ... | ... |
| p | jhg |

CACHING USING AN ADMISSION CONTROL CACHE LAYER

RELATED APPLICATION

Benefit is claimed under 35 U.S.C. 119(a)-(d) to Foreign Application Serial No. 201641014619 filed in India entitled "CACHING USING AN ADMISSION CONTROL CACHE LAYER", filed on Apr. 27, 2016, by VMware, Inc., which is herein incorporated in its entirety by reference for all purposes.

FIELD OF THE INVENTION

The various embodiments described in this document relate to the implementation of cache layers in different types of storage media.

BACKGROUND OF THE INVENTION

Storage caches are widely used in storage systems for improving input/output (I/O) latency and I/O throughput. Traditionally, caches were implemented solely in memory (e.g., a random access memory (RAM) or another volatile storage). Today, non-volatile flash-based devices, such as solid-state drives (SSDs), increasingly are used as caching layers, where flash-based caches are implemented and managed indistinguishably from memory caches. However, flash-based solid-state drives and volatile storage devices have different characteristics and tradeoffs with respect to performance, reliability and capacity.

For example, erase-and-write cycles impact the lifetime of flash-based caches differently than memory. In typical cache algorithms, when there is a cache hit, data is read from the cache, and when there is a cache miss, data is written to the cache. As each cache fill involves an erase-and-write cycle, each cycle on a cache implemented on a flash-based solid-state drive has a significant impact on the lifespan of the flash-based solid-state drive.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

This document describes embodiments that implement a first caching layer as an admission control cache layer to a flash-based second caching layer. In particular, embodiments are directed to minimizing the number of erase-and-write cycles that are performed on the flash-based second caching layer. For example, embodiments include a first caching layer that may be implemented within random access memory (RAM), and a second caching layer that may be implemented within a solid-state drive (SSD). The first caching layer stores metadata associated with data stored in an underlying storage device and not the data itself, to allow the first caching layer to maintain a larger history of data requests. The second caching laying stores the data itself. When a request for data is received from a client, embodiments check the first caching layer to determine whether metadata associated with the data is stored in the first caching layer and the second caching layer to determine whether the data is stored in the second caching layer. When the data is stored in the second caching layer, embodiments retrieve the data from the second caching layer and send the data to the client. If the data is not stored in the first caching layer and the data is not stored in the second caching layer, embodiments retrieve the data from storage and send the data to the client, but do not write the data to the second caching layer in response to the miss in the second caching layer. If the metadata is stored in the first caching layer and the data is not stored in the second caching layer, embodiments retrieve the data from storage, send the data to the client, and write the data to the second caching layer in response to the miss in the second caching layer. When the metadata is not stored in the first caching layer, embodiments write the metadata to the first caching layer. As a result, data is only written to the second caching layer when metadata associated with the data is stored in the first caching layer. Thus, the data is only written to the second caching layer after at least two requests are received requesting the data, thereby increasing the lifespan of the flash-based second caching layer by restricting the number of erase-and-write cycles on the flash-based second caching layer to data that is more frequently requested.

This document further describes embodiments that retrieve cache performance statistics and analyze cache hit statistics in determining when the first caching layer is to be implemented as an admission control cache layer and when to suspend using the first caching layer as an admission control cache layer. In one embodiment, when the cache hit rate is lower than a threshold value, the first caching layer is used as the admission control cache layer. Conversely, when the cache hit rate is higher than the threshold value, the first caching layer is suspended from being used as the admission control cache layer.

Figure 1:
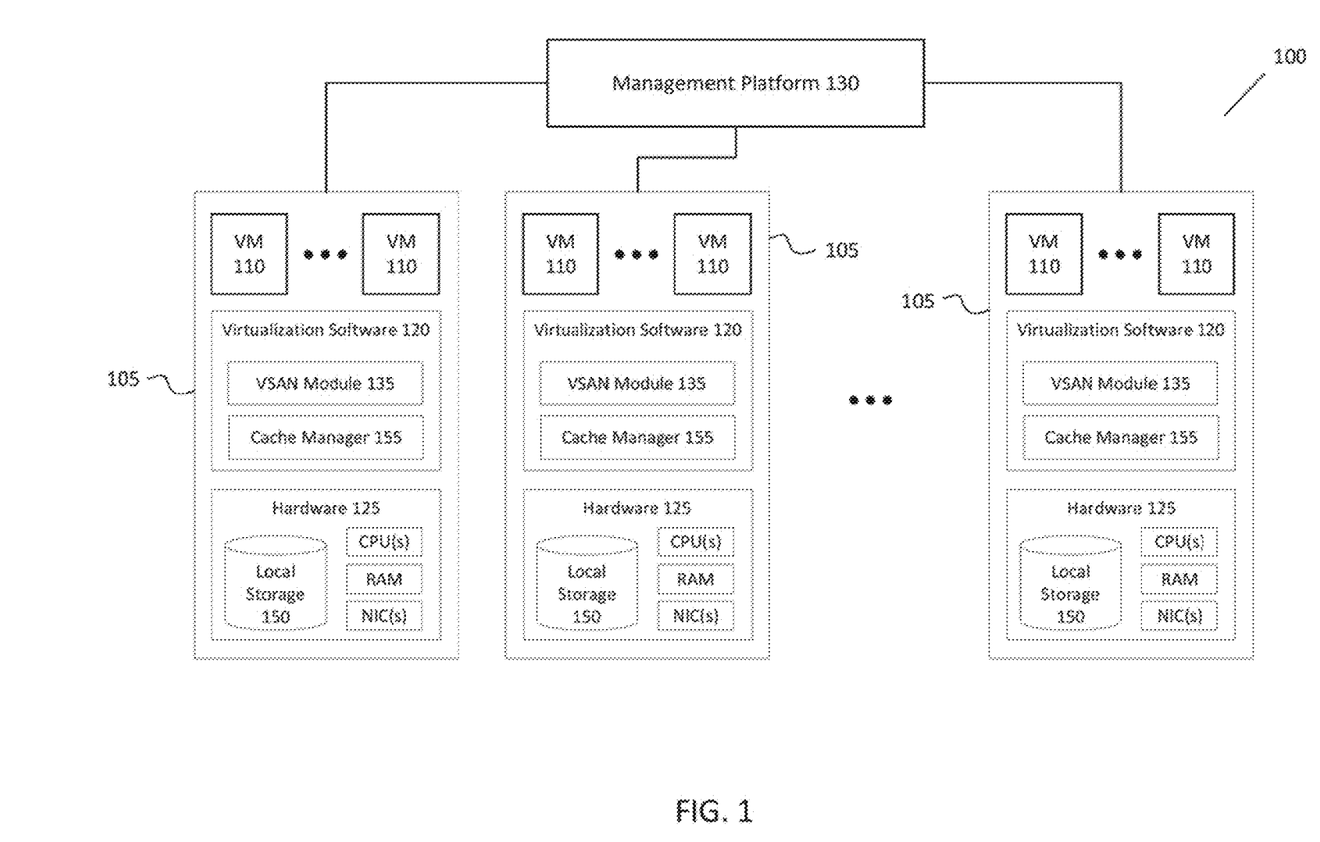
FIG. 1 illustrates, in block diagram form, an exemplary virtual data center environment including one or more networked processing devices implementing a first caching layer configured to operate as an admission control cache layer to a second caching layer.

FIG. 1 illustrates, in block diagram form, exemplary computing environment 100, including one or more networked nodes 105 to implement a first caching layer as an admission control cache layer to a flash-based second caching layer. Nodes 105 may also be referred to within this document as computers and/or servers. In one embodiment, server-based computing in computing environment 100 provides centrally-managed user virtual desktops, such as those implemented by virtual machines (VMs) 110, via one or more networks (e.g., a local area network or other private or publically accessible wide area network, such as the Internet). For example, a client device and a VM 110 use a desktop remoting protocol such as Remote Desktop Protocol (RDP), Virtual Network Computing (VNC), or Personal Computer over Internet Protocol (PCoIP) to remotely access/provide remote access to a virtual desktop generated by the VM 110. In one embodiment, one or more VMs 110 implement a virtualized computer, networking, storage, or security service (e.g., a firewall, webserver, database server, etc.). In one embodiment, computing environment 100 provides segregated server-based computing environments for multiple datacenter tenants. A datacenter tenant refers to a group of users that share common access with specific privileges. For example, the group of users may have common access to stored data objects, applications, etc. that users of another tenant may not access.

Hardware 125 includes one or more processors ("CPU(s)"), data storage and memory (e.g., "RAM"), and network interface controllers ("NIC(s)"). The data storage and memory may be used for storing data, metadata, and programs for execution by the processor(s). The data storage and memory may include one or more of volatile and non-volatile memories, such as Random Access Memory ("RAM"), Read Only Memory ("ROM"), a solid-state drive ("SSD"), Flash, Phase Change Memory ("PCM"), or other types of data storage, such as magnetic disk drives, optical disk drives, etc. The memory may be internal or distributed memory.

One or more buses may be used to interconnect the various components of hardware 125. Additionally, the network interface controllers may be used to connect nodes 105, via a wired or wireless network, with one another.

Virtualization software layer 120 runs on hardware 125 of host server or node (e.g., a physical computer) 105. Virtualization software layer 120 manages VMs 110 and physical resources, such as hardware 125. Additionally, virtualization software layer 120 maintains virtual-to-physical hardware mappings. For example, virtualization software 120 may manage VM access to a processor, memory, or a network interface within hardware 125. Additionally, virtualization software 120 may manage access to virtual disks (or portions thereof) and other related files within local storage 150 that may be accessed by VMs 110 residing in one or more nodes 105.

Management platform 130 is associated with nodes 105. Management platform 130 enables an administrator to manage the configuration of computing environment 100. In one embodiment, management platform 130 provides a management console for manual and automated control of nodes 105, VMs 110, and hardware 125. For example, management platform 130 may provision, configure, and maintain VMs 110 as virtual desktops or network services, manage pools of computer resources to run VMs 110, etc. In one embodiment, an administrator sets and/or defines storage policies using management platform 130.

Local storage 150 housed in or otherwise directly attached to the nodes 105 may include combinations of solid-state drives (SSDs) and/or magnetic or spinning disks (MDs). As used in this document, the term "housed" or "housed in" may be used to encompass both housed in or otherwise directly attached storage. In certain embodiments, SSDs serve as a read cache and/or write buffer in front of magnetic disks to increase I/O performance.

Each node 105 includes storage management or VSAN module 135 to automate storage management workflows and provide access to objects. Each VSAN module 135 (e.g., through an object management layer or submodule) communicates with other VSAN modules 135 of other nodes 105 to create and maintain an in-memory metadata database (e.g., maintained separately but in synchronized fashion in the memory of each node 105) that contains metadata describing the locations, configurations, policies, and relationships among the various objects stored in an object store. This in-memory metadata database is utilized by a VSAN module 135 on a node 105, for example, when an administrator first creates a virtual disk for a VM 110 as well as when the VM 110 is running and performing I/O operations (e.g., read or write) on the virtual disk. VSAN module 135 traverses a hierarchy of objects using the metadata in the in-memory database in order to properly route an I/O operation request to the node (or nodes) 105 that houses (house) the actual physical local storage that backs the portion of the virtual disk that is subject to the I/O operation.

In one embodiment, one or more nodes 105 include cache manager 155. Cache manager 155 manages and implements cache configuration and policies. For example, cache manager 155 implements cache admission and eviction as described with reference to FIGS. 2-4. Additionally, while described with reference to computing environment 100, cache manager 155 may also be implemented in other computing environments. For example, cache manager 155 may implement the admission control cache layer described within this document in a server, computer, or other computing environment that does not include virtual machines.

Figure 2:
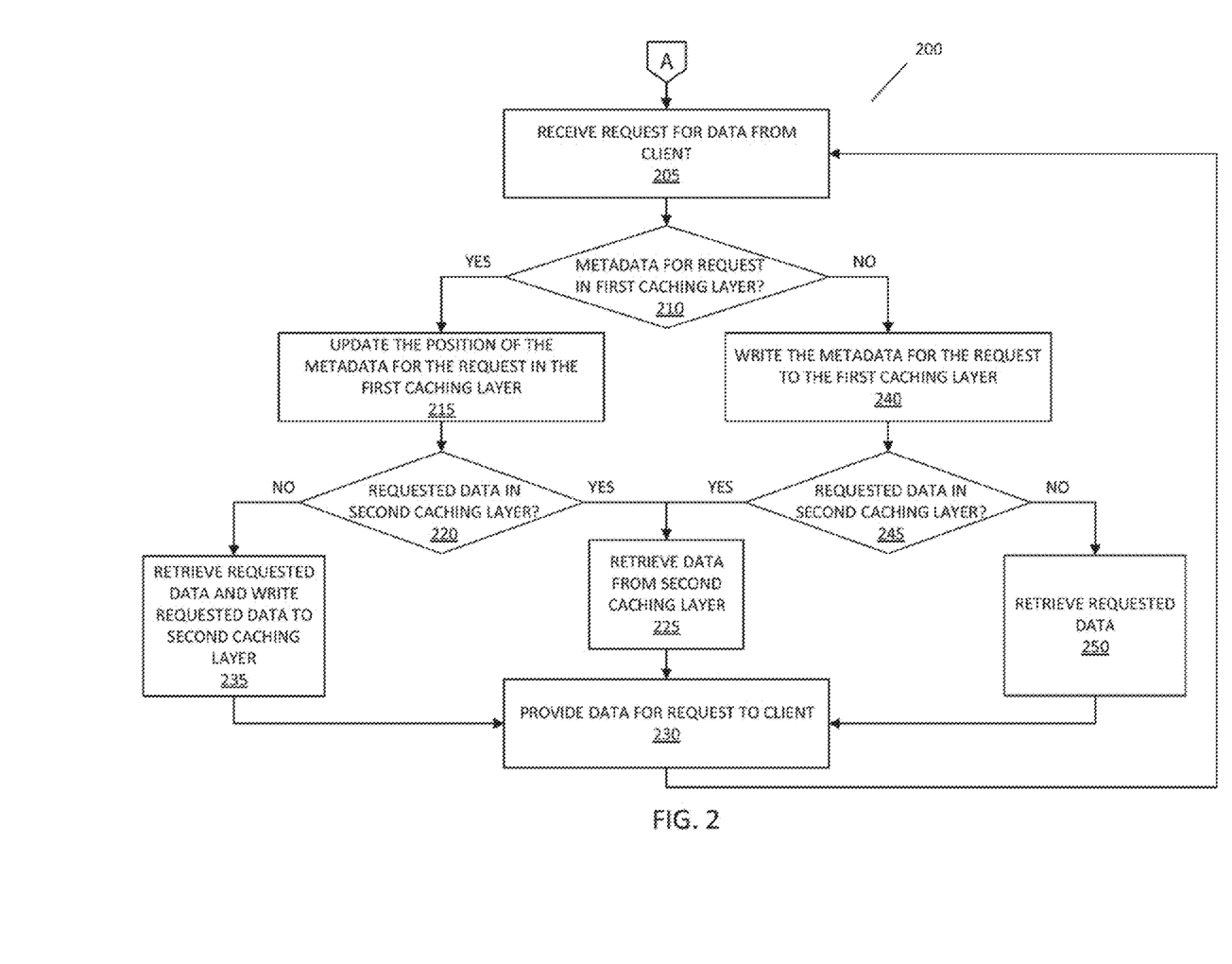
FIG. 2 is a flow chart illustrating an exemplary method of managing a cache using a first caching layer configured to operate as an admission control cache layer to a second caching layer.

FIG. 2 is a flow chart illustrating an exemplary method 200 of managing a cache using a first caching layer configured to operate as an admission control cache layer to a second caching layer. In some embodiments, the first caching layer may be implemented in RAM and the second caching layer may be implemented in a flash-based SSD. As a result, cache fills in the first caching layer that are associated with less frequently used data will have the insignificant overhead associated with RAM.

At block 205, a node 105 receives a request from a client for data stored in local storage 150 attached to node 105. For example, a VM 110 on the same node or a different node may generate a read request, which is received by cache manager 155. As used in the description of FIG. 2, "client" may refer to a VM 110, an application, or another module that can issue an input/output request to a cache and/or storage 150.

At block 210, node 105 determines whether metadata associated with the data is stored in a first caching layer. In some embodiments, the metadata is disk offset data for data. For example, the disk offset data may indicate a logical block address for the data in local storage 150. In some embodiments, the first caching layer is implemented using a least recently used (LRU) caching algorithm, which discards metadata for the least recently used data first once the LRU list reaches capacity. Alternatively, the first caching layer is implemented using another caching algorithm, e.g., least frequently used (LFU), random replacement (RR), an adaptive replacement cache (ARC), etc.

If metadata associated with the data is stored in the first caching layer, at block 215, node 105 modifies the first caching layer by moving the block containing the metadata for the data from its current position to the first position in the list or otherwise updating the cache to reflect the frequency of the use of the metadata within the first caching layer. In some embodiments, the second caching layer is implemented using an ARC caching algorithm. Alternatively, the first caching layer is implemented using another caching algorithm, e.g., LRU, LFU, RR, etc.

Continuing to block 220, when metadata associated with the data is stored in the first caching layer, node 105 determines whether the requested data is stored in a second caching layer. If the requested data is stored in the second caching layer, at block 225, node 150 retrieves the requested data from the second caching layer. At block 230, node 105 transmits the requested data retrieved from the second caching layer to the client.

If the requested data is not stored in the second caching layer, at block 235, node 105 retrieves the requested data from local storage 150 and writes the requested data to the second caching layer. Continuing to block 230, node 105 transmits the requested data retrieved from local storage 150 to the client.

If metadata associated with the data is not stored in the first caching layer, at block 240, node 105 writes the metadata associated with the requested data to the first caching layer in response to the first caching layer miss at block 210. For example, node 105 may write disk offset data for the data to a first position in the first caching layer to indicate the data as being the most recently accessed data.

Continuing to block 245, when metadata associated with the data was not stored in the first caching layer (at block 210), node 105 determines whether the requested data is stored in the second caching layer. If the requested data is stored in the second caching layer, at block 225, node 150 retrieves the requested data from the second caching layer. At block 230, node 105 transmits the requested data retrieved from the second caching layer to the client.

If the requested data is not stored in the second caching layer, at block 250, node 105 retrieves the requested data from local storage 150. Unlike typical cache misses, however, node 105 does not write the data to the second caching layer in response to the miss because there was also a miss when looking for the metadata in the first caching layer. Continuing to block 230, node 105 transmits the requested data retrieved from local storage 150 to the client.

In an alternative embodiment (not shown), when metadata associated with the data is not stored in the first caching layer, node 105 adds the metadata to the first caching layer, bypasses the second caching layer, and retrieves the requested data from local storage 150.

In some embodiments, the first caching layer stores only the metadata for data and not the actual data itself. By writing only the metadata to the first caching layer, the first caching layer may be utilized to maintain history information for requests and accessed data for a longer period of time by consuming less storage space than typical cache implementations that store the data.

FIGS. 3A-3E illustrate exemplary first caching layer 300, second caching layer 305, and storage 310. First caching layer 300 is configured to operate as an admission control cache layer to second caching layer 305 using, e.g., method 200 of FIG. 2. First caching layer 300 is illustrated with a cache size of m entries and configured to store metadata for a plurality of data. In one embodiment, the metadata indicates a location (e.g., disk offset data) the plurality of data in storage 310. Second caching layer 305 is illustrated with a cache size of n entries and configured to store metadata for the plurality of data, and the plurality of data retrieved from storage 310 and written to the second caching layer 305. In one embodiment, m=n. Storage 310 is illustrated with a size of p blocks and configured to store the plurality of data.

Figure 3A:
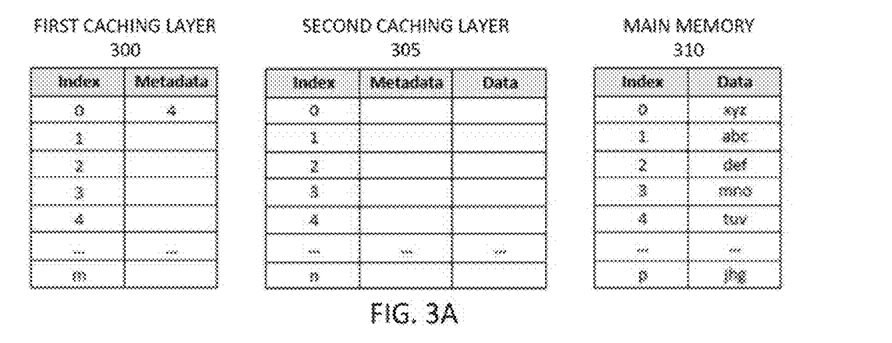
FIGS. 3A-3E illustrate two caching layers and a storage with a first caching layer configured to operate as an admission control cache layer.

FIG. 3A illustrates caching layers after a first request from a client for data "tuv" stored in storage 310 at block 4. Using the exemplary method 200 of FIG. 2, when the request for "tuv" is received, node 105 determines whether the metadata for "tuv" is stored in first caching layer 300. Assuming the metadata is not stored in first caching layer 300, node 105 determines whether the data for "tuv" is stored in second caching layer 305. As the data is not stored in second caching layer 305, node 105 retrieves the data "tuv" from storage and writes the metadata "4," e.g., the disk offset data for data "tuv," to index "0" in first caching layer 300. As described with reference to FIG. 2, node 105 does not write the data to second caching layer 305 in response to this miss because there was also a miss when looking for the metadata in first caching layer 300.

Figure 3B:
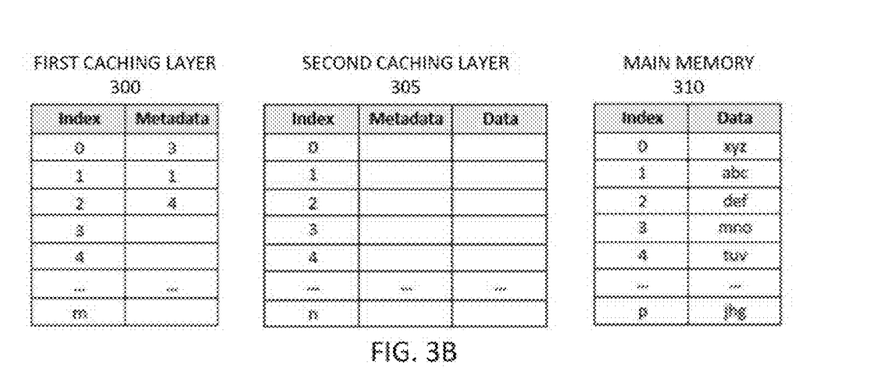

FIG. 3B illustrates first caching layer 300 and second caching layer 305 following additional requests from the client for data stored in storage 310. As illustrated, data "abc" and "mno" are subsequently received by node 105. As in FIG. 3A, the requested data is not stored in second caching layer 305, while the metadata for the requested data is stored in first caching layer 300. As illustrated, as subsequent requests are received, the metadata for each subsequent requested data is added as the top block or top position of first caching layer 300 and previous requests are pushed down the list.

Figure 3C:
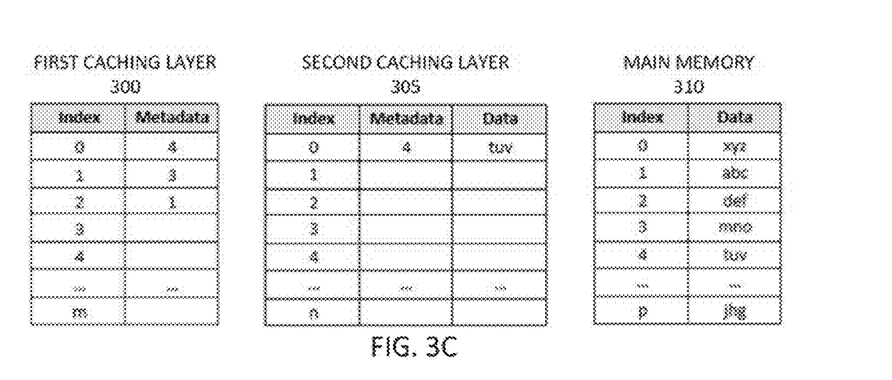

FIG. 3C illustrates first caching layer 300 and second caching layer 305 following a second request from the client for data "tuv" stored in storage 310. Using the exemplary method 200 of FIG. 2, when the second request for "tuv" is received, node 105 determines whether the metadata for "tuv" is stored in first caching layer 300. As the metadata for "tuv" is stored in first caching layer 300, at index "2," node 105 determines whether the data for "tuv" is stored in second caching layer 305. As the data is not stored in second caching layer 305, node 105 retrieves the data "tuv" from storage. Additionally, in response to determining that the metadata for "tuv" is stored in first caching layer 300, node 105 writes the data to index "0" of second caching layer 305. In addition, node 105 re-arranges the order of the blocks in first caching layer 300 by moving the metadata "4," e.g., the disk offset data for data "tuv," from index "2" to index "0" in first caching layer 300. Modifying the list to move the block containing "tuv" to the first position (e.g., index "0") is in response to data "tuv" being the most recently used or accessed data from local storage 150.

Figure 3D:
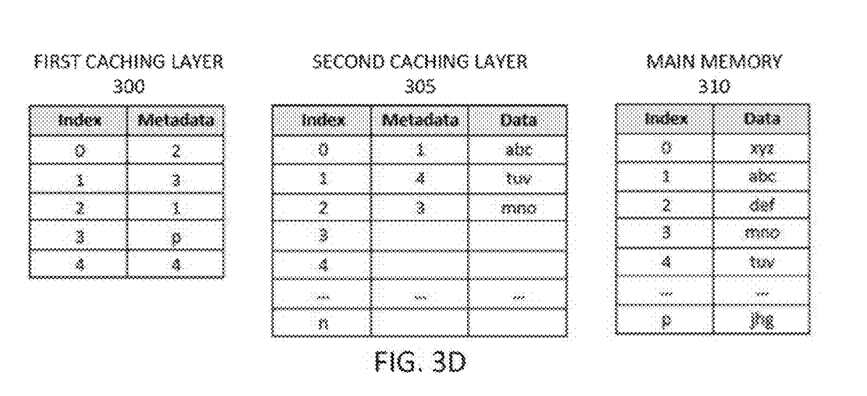

FIG. 3D illustrates first caching layer 300 and second caching layer 305 following a series of additional requests from the client for data stored in storage 310. As illustrated in FIG. 3D, given a cache size of five for first caching layer 300, following the series of additional requests received by node 105, first caching layer 300 is full, and additional data has been written to second caching layer 305. Using the exemplary method 200 of FIG. 2, when a request for "xyz" is received, node 105 determines whether the metadata for "xyz" is stored in first caching layer 300. As the metadata for "xyz" is not stored in first caching layer 300, node 105 determines whether the data for "xyz" is stored in second caching layer 305. As the data is not stored in second caching layer 305, node 105 retrieves the data "xyz" from storage and writes the metadata "0," e.g., the disk offset data for data "xyz," to index "0" in first caching layer 300. The result of writing the metadata for "xyz" to first caching layer 300 is the eviction of the metadata for data "tuv" from index "4" of first caching layer 300, as it is located in the last block of first caching layer 300. Meanwhile, the data for "tuv" remains in second caching layer 305. As described with reference to FIG. 2, node 105 does not write the data to second caching layer 305 in response to this miss because there was also a miss when looking for the metadata in first caching layer 300.

Figure 3E:
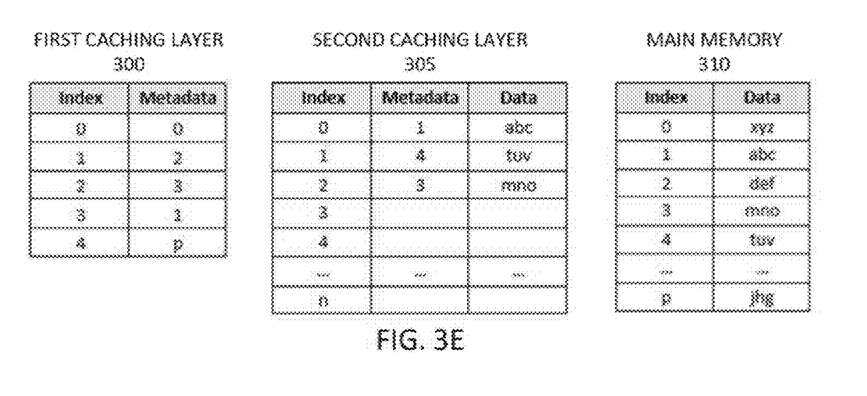

FIG. 3E illustrates first caching layer 300 and second caching layer 305 following the request from the client for data "xyz." Using the exemplary method 200 of FIG. 2, when a subsequent request for "tuv" is received, node 105 determines whether the metadata for "tuv" is stored in first caching layer 300. The metadata for "tuv" is not stored in first caching layer 300 after having been evicted from first caching layer 300 by the request described above. Node 105 then determines whether the data for "tuv" is stored in second caching layer 305. While the metadata for "tuv" was evicted from first caching layer 300, the data for "tuv" is stored at index "1" of second caching layer 305. As the data for "tuv" is stored in second caching layer 305, node 105 retrieves the data "tuv" from second caching layer 305. Node 105 writes the metadata "4," e.g., the disk offset data for data "tuv," to index "0" in first caching layer 300, resulting in the eviction of the metadata "p" from index "4."

Figure 4:
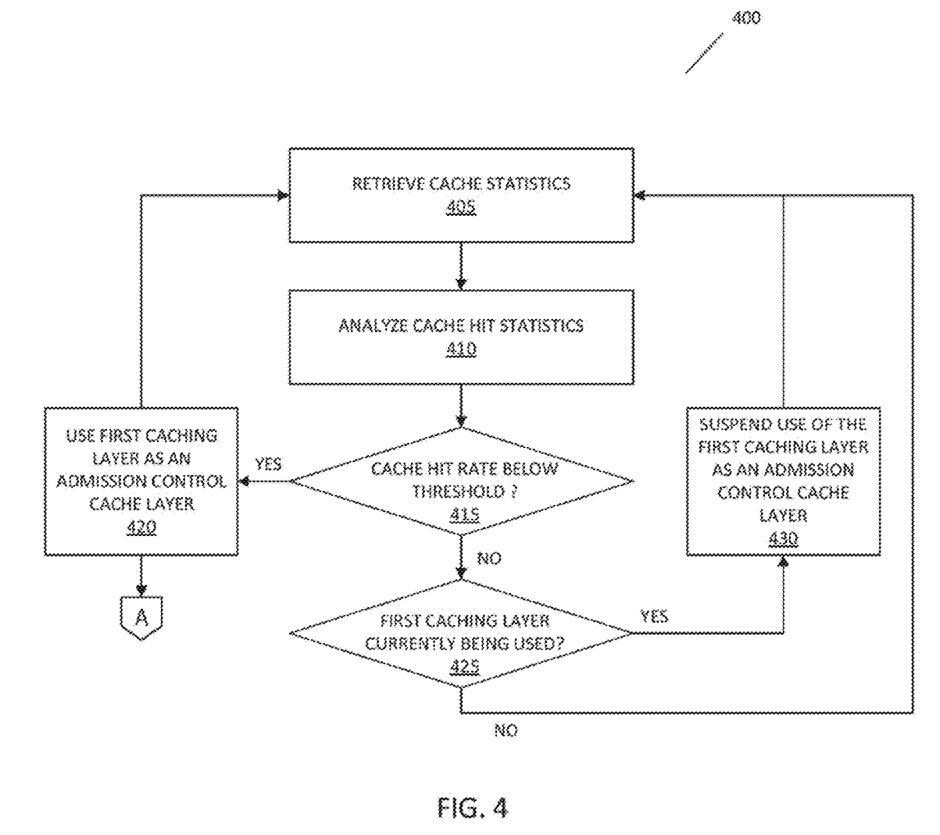
FIG. 4 is a flow chart illustrating an exemplary method of determining if an admission control cache layer should be used for cache management.

FIG. 4 is a flow chart illustrating an exemplary method 400 of determining if an admission control cache layer should be used for cache management. In particular, method 400 retrieves and analyze cache performance statistics to determine whether to use or suspend us of a first caching layer as an admission control cache layer to a second caching layer. At block 405, node 105 retrieves cache statistics for caching operations (e.g., cache hits, cache misses). The cache statistics may be real-time cache statistics of cache performance, or may be data aggregated over a predetermined range of time. At block 410, node 105 analyzes the cache hit statistics. In some embodiments, the cache hit statistics are a cache hit rate. The cache hit rate may be a percentage value or a raw number. Node 105 analyzes the cache hit statistics by extracting the data from the real-time cache statics and normalizing the cache hit statistics data for comparison to a threshold value.

At block 415, node 105 determines whether the cache hit rate is below the threshold value. In some embodiments, the threshold value is a static value or a dynamic value. For example, the dynamic value may be modified based on run-time workload and statistics. In one embodiment, a modification to the cache size results in a modification to the dynamic threshold value. For example, when the size of the second caching layer is reduced, the dynamic threshold value is reduced. Conversely, when the size of the second caching layer is increased, the dynamic threshold value is increased.

If the cache hit rate is below the threshold value, at block 420, node 105 uses the first caching layer as an admission control cache layer. When the cache hit rate is below the threshold value, it may be an indication that a smaller amount of data being requested multiple times by the client. Node 105 waits to receive a request for data from client (e.g., by proceeding with method 200 at block 205 via off-page connector A). In parallel to receiving requests for data from client, node 105 also returns to block 405 to retrieve cache performance statistics, including updated cache performance statistics.

If the cache hit rate is above the threshold value, at block 425, node 105 determines whether a first caching layer configured to operate as an admission control cache layer is being used. If the first caching layer is being used, at block 430, node 105 suspends the use of the first caching layer as the admission control cache layer. If the first caching layer is not being used, node 105 returns to block 405 and monitors for updated cache performance statistics.

It will be apparent from this description that aspects of the inventions may be embodied, at least in part, in software. That is, the computer-implemented methods 200 and 400 may be carried out in a computer system or other data processing system, such as nodes 105, in response to its processor executing sequences of instructions contained in a memory or other non-transitory machine-readable storage medium. The software may further be transmitted or received over a network (not shown) via a network interface. In various embodiments, hardwired circuitry may be used in combination with the software instructions to implement the present embodiments. It will also be appreciated that additional components, not shown, may also be part of nodes 105, and, in certain embodiments, fewer components than that shown in FIG. 1 may also be used in nodes 105.

An article of manufacture may be used to store program code providing at least some of the functionality of the embodiments described above. Additionally, an article of manufacture may be used to store program code created using at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of non-transitory machine-readable media suitable for storing electronic instructions. Additionally, embodiments of the invention may be implemented in, but not limited to, hardware or firmware utilizing an FPGA, ASIC, a processor, a computer, or a computer system including a network. Modules and components of hardware or software implementations can be divided or combined without significantly altering embodiments of the invention.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses distinct name spaces to isolate the containers from each other and therefore provides operating-system level segregation of the different groups of applications that operate within different containers. This segregation is akin to the VM segregation that is offered in hypervisor-virtualized environments, and thus can be viewed as a form of virtualization that isolates different groups of applications that operate in different containers. Such containers are more lightweight than VMs.

It should be recognized that while the specification refers to VMs, the examples given could be any type of DCNs, including physical hosts, VMs, non-VM containers, and hypervisor kernel network interface modules. In fact, the example networks could include combinations of different types of DCNs in some embodiments.

In the foregoing specification, the invention has been described with reference to specific exemplary embodiments thereof. Various embodiments and aspects of the invention(s) are described with reference to details discussed in this document, and the accompanying drawings illustrate the various embodiments. The description above and drawings are illustrative of the invention and are not to be construed as limiting the invention. References in the specification to "one embodiment," "an embodiment," "an exemplary embodiment," etc., indicate that the embodiment described may include a particular feature, structure, or characteristic, but not every embodiment may necessarily include the particular feature, structure, or characteristic. Moreover, such phrases are not necessarily referring to the same embodiment. Furthermore, when a particular feature, structure, or characteristic is described in connection with an embodiment, such feature, structure, or characteristic may be implemented in connection with other embodiments whether or not explicitly described. Additionally, as used in this document, the term "exemplary" refers to embodiments that serve as simply an example or illustration. The use of exemplary should not be construed as an indication of preferred examples. Blocks with dashed borders (e.g., large dashes, small dashes, dot-dash, dots) are used to illustrate optional operations that add additional features to embodiments of the invention. However, such notation should not be taken to mean that these are the only options or optional operations, and/or that blocks with solid borders are not optional in certain embodiments of the invention. Numerous specific details are described to provide a thorough understanding of various embodiments of the present invention. However, in certain instances, well-known or conventional details are not described in order to provide a concise discussion of embodiments of the present inventions.

It will be evident that various modifications may be made thereto without departing from the broader spirit and scope of the invention as set forth in the following claims. For example, the methods described in this document may be performed with fewer or more features/blocks or the features/blocks may be performed in differing orders. Additionally, the methods described in this document may be repeated or performed in parallel with one another or in parallel with different instances of the same or similar methods.

What is claimed is:

1. A computer-implemented method, comprising:
   receiving, from a client, a request to access data stored in one or more storage devices;
   determining whether metadata associated with the requested data is stored in a first caching layer, the first caching layer storing metadata associated with stored data but not the data itself;
   in response to determining that the metadata for the data is not stored in the first caching layer,
      determining if the data is stored in a second caching layer,
      in response to determining that the data is stored in the second caching layer, retrieving the data from the second caching layer, and
      in response to determining that the data is not stored in the second caching layer:
         retrieving the data from the one or more storage devices,
         bypassing writing of the data to the second caching layer, and
         storing metadata associated with the retrieved data in the first caching layer; and
   sending the data to the client.

2. The computer-implemented method of claim 1, further comprising:
   in response to determining that the metadata for the data is stored in the first caching layer,
      determining if the data is stored in a second caching layer,
      in response to determining that the data is not stored in the second caching layer,
         retrieving the data from the one or more storage devices, and
         writing the data to the second caching layer, and
      in response to determining that the data is stored in the second caching layer, retrieving the data from the second caching layer.

3. The computer-implemented method of claim 2, wherein the data is written to the second caching layer upon receiving at least two requests to access the data.

4. The computer-implemented method of claim 1, wherein storing the metadata for the data in the first caching layer further comprises:
   writing disk offset data for the data in the first caching layer.

5. The computer-implemented method of claim 1, wherein the first caching layer is implemented within random access memory and wherein the second caching layer is implemented within a solid-state drive.

6. The computer-implemented method of claim 1, wherein the first caching layer stores metadata associated with a plurality of data and does not store the plurality of data.

7. The computer-implemented method of claim 1, further comprising:
   retrieving run-time cache statistics;
   analyzing the run-time cache statistics to determine a run-time cache hit rate;
   in response to the run-time cache hit rate being below a hit threshold, utilizing the first caching layer as an admission control cache layer for the second caching layer; and
   in response to the run-time cache hit rate being above the hit threshold, suspending use of the first caching layer as the admission control cache layer for the second caching layer.

8. The computer-implemented method of claim 7, wherein the run-time cache hit rate being below the hit threshold indicates a smaller amount of data being requested multiple times by the client.

9. A non-transitory computer-readable medium storing instructions, which when executed by a processing device, cause the processing device to perform a method comprising:
   receiving, from a client, a request to access data stored in one or more storage devices;
   determining whether metadata associated with the requested data is stored in a first caching layer, the first caching layer storing metadata associated with stored data but not the data itself;
   in response to determining that the metadata for the data is not stored in the first caching layer,
      determining if the data is stored in a second caching layer,
      in response to determining that the data is stored in the second caching layer, retrieving the data from the second caching layer, and
      in response to determining that the data is not stored in the second caching layer:
         retrieving the data from the one or more storage devices,
         bypassing writing of the data to the second caching layer, and
         storing metadata associated with the retrieved data in the first caching layer; and
   sending the data to the client.

10. The non-transitory computer-readable medium of claim 9, further comprising:
    in response to determining that the metadata for the data is stored in the first caching layer, determining if the data is stored in a second caching layer, in response to determining that the data is not stored in the second caching layer, retrieving the data from the one or more storage devices, and writing the data to the second caching layer, and in response to determining that the data is stored in the second caching layer, retrieving the data from the second caching layer.

11. The non-transitory computer-readable medium of claim 10, wherein the data is written to the second caching layer upon receiving at least two requests to access the data.

12. The non-transitory computer-readable medium of claim 9, wherein the writing of the data to the second caching layer, further comprises:

storing the metadata for the data in the first caching layer;

modifying the first caching layer to the store the metadata for the data.

13. The non-transitory computer-readable medium of claim 12, wherein storing the metadata for the data in the first caching layer further comprises:

writing disk offset data for the data in the first caching layer.

14. The non-transitory computer-readable medium of claim 9, wherein the first caching layer is implemented within random access memory and wherein the second caching layer is implemented within a solid-state drive.

15. The non-transitory computer-readable medium of claim 9, wherein the first caching layer stores metadata associated with a plurality of data and does not store the plurality of data.

16. The non-transitory computer-readable medium of claim 9, further comprising:

retrieving run-time cache statistics;

analyzing the run-time cache statistics to determine a run-time cache hit rate;

in response to the run-time cache hit rate being below a hit threshold, utilizing the first caching layer as an admission control cache layer for the second caching layer; and in response to the run-time cache hit rate being above the hit threshold, suspending use of the first caching layer as the admission control cache layer for the second caching layer.

17. The non-transitory computer-readable medium of claim 16, wherein the run-time cache hit rate being below the hit threshold indicates a smaller amount of data being requested multiple times by the client.

18. An apparatus comprising:

a processing device; and a memory coupled to the processing device, the memory storing instructions which, when executed by the processing device, cause the apparatus to:

receive, from a client, a request to access data stored in one or more storage devices;

determine whether metadata associated with the requested data is stored in a first caching layer, the first caching layer storing metadata associated with stored data but not the data itself;

in response to determining that the metadata for the data is not stored in the first caching layer, determine if the data is stored in a second caching layer, in response to determining that the data is stored in the second caching layer, retrieve the data from the second caching layer, and in response to determining that the data is not stored in the second caching layer:

retrieve the data from the one or more storage devices, bypass writing of the data to the second caching layer, and store metadata associated with the retrieved data in the first caching layer; and send the data to the client.

19. The apparatus of claim 18, wherein the instructions further cause the apparatus to:

in response to determining that the metadata for the data is stored in the first caching layer, determine if the data is stored in a second caching layer, in response to determining that the data is not stored in the second caching layer, retrieve the data from the one or more storage devices, and write the data to the second caching layer, and in response to determining that the data is stored in the second caching layer, retrieving the data from the second caching layer.

* * * * *